June 25, 1968  J. D. ROBERTSON  3,389,450
NON-DEFLECTING ROLL
Filed May 20, 1966  2 Sheets-Sheet 1
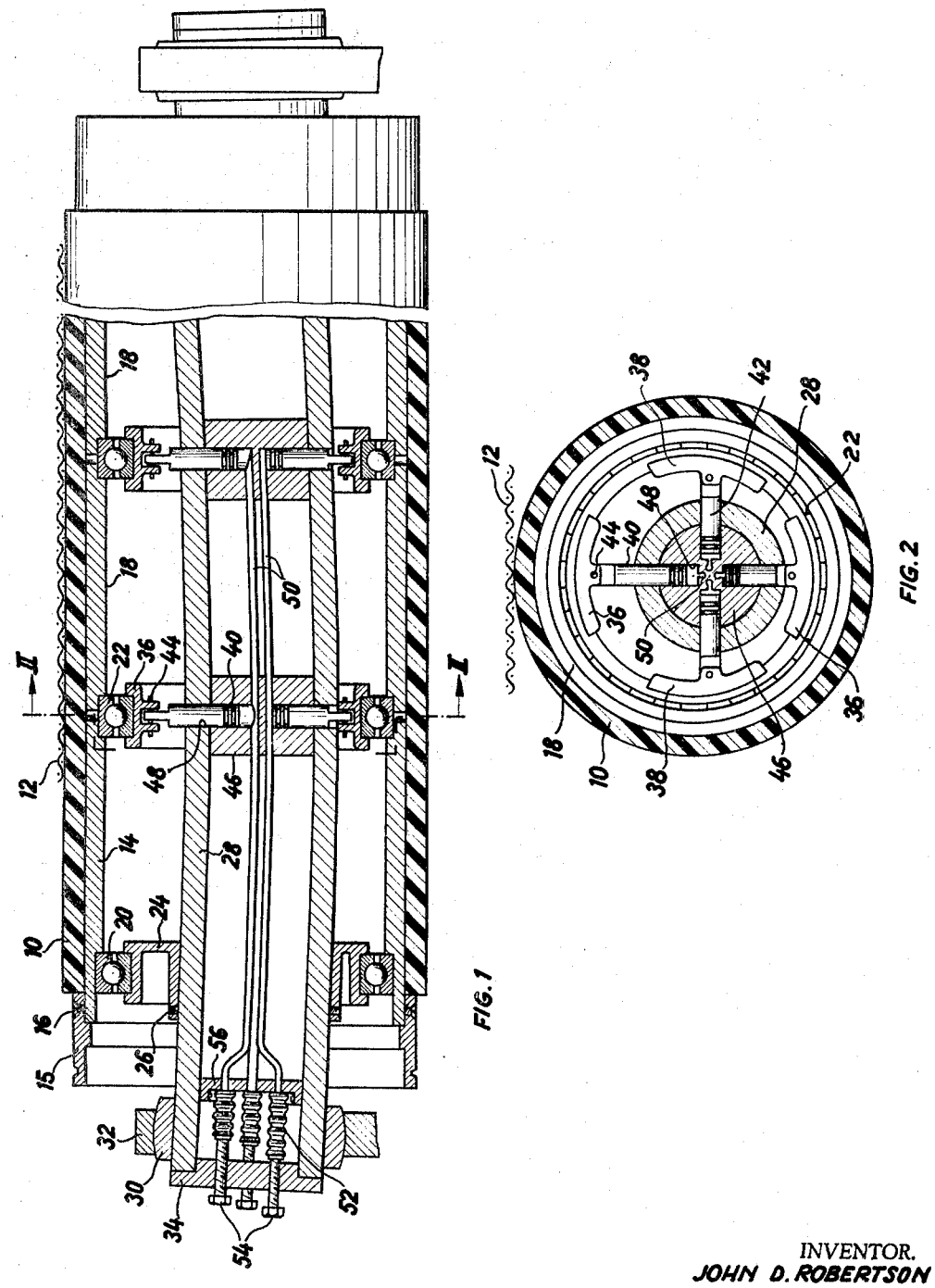
INVENTOR.
JOHN D. ROBERTSON
BY
Kenway, Jenney & Hildreth June 25, 1968  J. D. ROBERTSON  3,389,450
NON-DEFLECTING ROLL Filed May 20, 1966  2 Sheets-Sheet 2

INVENTOR.
JOHN D. ROBERTSON
BY
Kenway, Jenney & Hildreth

3,389,450
NON-DEFLECTING ROLL
John D. Robertson, Taunton, Mass., assignor, by mesne assignments, to Mount Hope Machine Company, Incorporated, Taunton, Mass., a corporation of Massachusetts
Filed May 20, 1966, Ser. No. 551,676
3 Claims. (Cl. 29—116)

ABSTRACT OF THE DISCLOSURE

A roll comprising a support and a sleeve rotatable thereon, has means for removing transverse deflection or sag. Bearings at the ends of the sleeve are fixed, but intermediate bearings are mounted on supports movable transversely of the support in either of two directions, perpendicular to one another and to the axis of rotation of the sleeve. The bearing supports are positioned by shoes, expansible-chamber devices, cams, or the like, for independent positioning in either of the perpendicular directions to straighten the sleeve.

Background and brief description of the invention

This invention relates to rolls for supporting or squeezing longitudinally-traveling loads such as sheets, strands, or webs, and more particularly to an improved roll having means to correct against transverse deflection or sag which would otherwise be produced by the weight of the traveling load and of the roll itself, or by the squeezing pressure.

It has previously been recognized that the diameter of a conveyor roll might advantageously be reduced in some applications, and that the consequent reduction in transverse stiffness could be overcome by various means so as to hold the roll in a true cylindrical form. Rolls of reduced diameter are, for example, of value in paper-making process for supporting the traveling wire which serves to drain the water from a suspension of fibers as they are carried by the wire over a series of rolls.

It is the primary object of the present invention to provide an improved non-deflecting roll, having means for correction of transverse deflection. Further objects and advantages of the invention will become apparent as the following description proceeds.

Briefly stated, according to a preferred embodiment thereof, I may carry out my invention in a roll which includes an elongated support member or axle, and an annular cylindrical sleeve rotatably mounted on the support for peripheral engagement with the wire or other tangentially-traveling load. I provide mounting means which rotatably support the sleeve on the axle at three or more axially-spaced locations, and which provide for relative adjustment of the loci of the peripheral surface of the sleeve about these locations. In a preferred form, the sleeve is mounted in fixed relation to the axle at the two support locations nearest the ends of the roll, while intermediate locations are adjustable. Unlike previous constructions of which I am aware, the support member or axle itself is permitted to sag transversely to the extent dictated by the applied load, and the form of the sleeve is then corrected by adjusting the locus of its peripheral surface at the support locations lying intermediate the ends of the roll.

The mounting means include a series of bearings positioned at the various axially-spaced support locations, with the endmost pair preferably being supported in fixed relation to the axle. Each of the intermediate bearings is carried by a set of supports which are adjustable along various axes extending transversely to the longitudinal axis of the axle. Four such supports may be provided for each bearing, one pair being opposed along a common axis transverse to the axle and extending in the direction of the resultant of load application to the sleeve; and another pair being opposed along a common axis normal to the first. The principal sleeve-straightening adjustment is carried out with the first-mentioned set, with a secondary adjustment being provided by the second set to stabilize the bearing transversely.

Various adjustable bearing supports may be used for positioning the bearings, including expansible-chamber devices, and mechanical positioners such as cams. Suitable hydraulic devices include pistons operable in radial cylinders formed in the axle, and expansible elastomeric bags circumferentially spaced between the axle and the bearings. In one form of mechanically-positioned apparatus, the principal adjustment in the direction of application of the load resultant is performed by a cam which is asymmetric to the longitudinal axis of the axle, and which serves to shift a corresponding pair of the opposed bearing supports simultaneously in a manner to maintain the required constant diameter. However, the transverse pair of bearing supports is adjusted by a cam symmetrical about the longitudinal axis, to compensate for the changing dimension of the bearing along the transverse axis as it is moved in the direction of application of the load resultant.

While the specification concludes with claims particularly pointing out the subject matter which I regard as my invention, it is believed that a clearer understanding may be gained from the following detailed description of preferred embodiments, referring to the accompanying drawings, in which:

FIGURE 1 is a view in side elevation and partially in cross-section of a first form of the improved roll, having hydraulic positioning means;

FIGURE 2 is a sectional view taken along line 2—2 in FIGURE 1, looking in the direction of the arrows;

Figure 4:
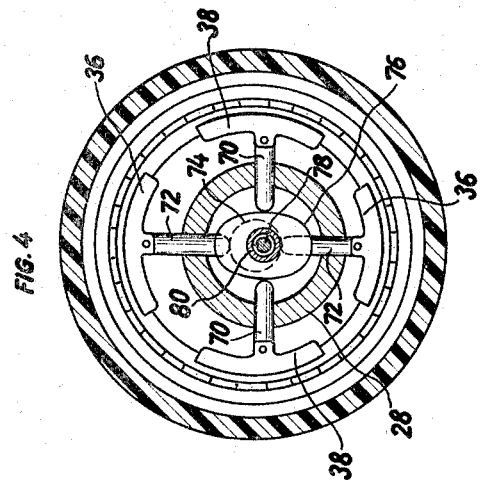
FIGURE 4 is a view similar to FIGURE 2, but showing a modification incorporating mechanical positioning means.

Referring first to FIGS. 1 and 2, the improved roll includes an elongated support member or axle 28, which is formed as a tubular cylinder to secure a maximum of transverse rigidity and moment of inertia with a minimum of weight for the desired diameter. Both sagging and vibration characteristics are optimized by using a tubular form of support.

A series of annular spools, including at least a pair of end spools 14, are rotatably mounted on the axle by a series of three or more antifriction bearings 20 and 22, each spool being supported at either end by one of these bearings. If more than two spools are needed, intermediate spools 18 are added as in the illustrated construction. The number and length of the spools is dictated by the required roll length and by the amount of sag which can be tolerated in each individual spool. It will be understood that the total number of bearings will be one more than the total number of spools. The ends of the roll are identical, and only one is shown in cross-section.

An annular sleeve 10, which is preferably made of a corrosion-resistant, hard, and moderately resilient material such as fiberglass or hard rubber, is engaged circumferentially about the spools, connecting them for rotation in unison about the longitudinal axis of the support member. Annular end caps 15 are secured on the end spools 14 by means of set screws 16, to locate the sleeve positively. The roll is shown carrying a wire 12 for longitudinal travel tangential to the roll surface, but may be used for the support of various longitudinally-traveling sheet, web, or strand materials, or for squeezing against a second roll.

The endmost bearings 20 are mounted in fixed relation to the longitudinal axis of symmetry of the axle 28 by any suitable means, such as the illustrated annular mounting rings 24, which are secured in place by set screws 26. However, each of the intermediate bearings 22 is radially adjustable on the axle by means of four support shoes arranged in pairs 36, 38, which arcuately engage the inner circumference of the bearing. Each shoe is pivotally connected by a pin 44 with one of a corresponding number of hydraulic pistons arranged in pairs 40, 42. The pair 40 is arranged for movement along a common radial axis extending in the direction of the point of application of the load resultant of the wire 12 on the sleeve 10, to adjust the position of the supported bearing 22 in this direction. The pistons 42 are arranged for movement along a perpendicular axis radial to the support, to adjust the shoes 38 to compensate for the change of internal dimension of the bearing 22 along this axis as the bearing is shifted along the first axis. The bearing is thus held in a stable relation to the axle, whatever its adjusted position.

Cylinders 48 for the pistons 40 and 42 are formed in inserts 46 received internally of the axle. These inserts may first be positioned and plug-welded or otherwise secured in place, after which the cylinders 48 are bored through the walls of the axle.

To supply fluid pressure at independently-controlled levels to each of the various pistons, conduits 50 extend longitudinally from one end of the axle into fluid communication with each of the cylinders 48. In the illustrated construction, having two intermediate bearings 22, cylinders of corresponding orientation in each of their supports are connected in common; in this form the two intermediate bearings are symmetrically spaced with respect to the axial center of the axle, so that equal adjustments of the two bearings 22 will be required. Any given pair of additional intermediate bearings which are symmetrically spaced with respect to the axial center can be supplied in common by additional sets of conduits. Additional bearings which are not spaced in symmetrical pairs will require individual conduits, e.g., a bearing located at the axial center, where an odd number of bearings are employed.

The conduits 50 are extended through a support disk 56, each to a corresponding bellows 52 mounted on this disk. The bellows, the conduits, and the cylinders 48 are filled with hydraulic fluid. The volumes of the bellows are adjustable by means of screws 54, threaded through an end cap 34 secured in the end of the axle.

To adjust the roll, the normal load is applied, and the bellows 52 which is connected with the cylinder 48 that directly confronts the load is adjusted to straighten the sleeve. The remaining screws 54 should be withdrawn somewhat before this adjustment is made, to allow such movement of the bearings 22 as may be required for this principal adjustment. Subsequently, the remaining bellows are compressed sufficiently to bring the lower shoes 36 and the transverse shoes 38 into suporting engagement with the bearings. Proper engagement may be determined by means of pressure gages (not shown) connected with the various conduits, or by using a torque wrench to tighten the screws 54. This will avoid excessive pressure of shoe contact, which would distort the inner bearing races. The roll is shown in an adjusted relation, with the axle 28 sagging somewhat as though under a normal load; the uppermost shoe 36 is extended further than the remaining shoes, and the lower shoe 36 is retracted to the greatest extent. Because of the upward displacement of the bearing relative to the axle, the shoes 38 are withdrawn somewhat from the positions they would have if the sleeve and axle were concentric.

It will be understood that the bellows 52 and screws 54 may be replaced by other means adapted to control the fluid volume of the cylinders 48, and that these may be located externally of the roll instead of being mounted within the axle as shown.

Figure 3:
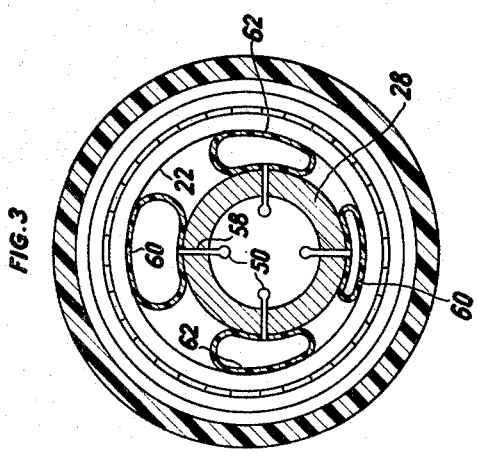
FIGURE 3 is a view similar to FIGURE 2, but showing a modified hydraulic positioning means.

A modified form of the invention is shown in FIGURE 3, in which the shoes and hydraulic pistons of the first embodiment are replaced by a series of elastomeric expansible bags 60, 62, which are circumferentially spaced about the axle 28 to bear directly against the inner circumference of the bearing 22. These bags are connected by conduits 50 having branches 58 with suitable volume control means, which like the remaining elements, may be similar to those described in the preceding embodiment, and need not be described in further detail.

Figure 5:
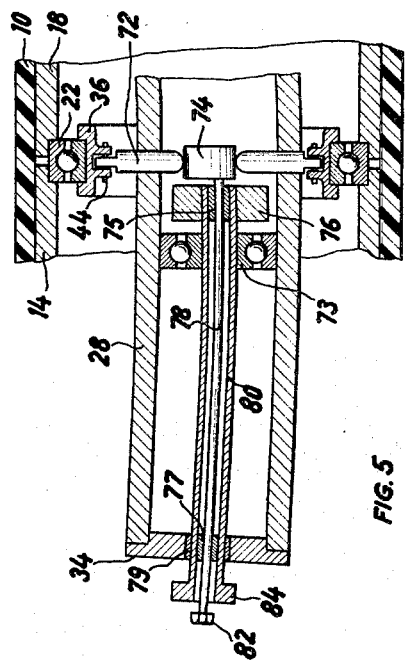
FIGURE 5 is a fragmentary cross-sectional view in side elevation of the construction of FIGURE 4.

Another construction is shown in FIGURES 4 and 5, in which an intermeditae bearing 22 is positioned by cam means. Each intermediate bearing is mounted on pairs of shoes 36, 38 as before, which are pivotally connected by pins 44 to pairs of cam follower fingers 72, 70. These fingers are slidably received and guided for radial movement in suitable bores through the walls of the axle 28.

A first cam 74 is asymmetrical to an adjusting shaft 78 to which it is affixed; this shaft extends along the longitudinal axis of the axle 28 through the end cap 34, and terminates in a hexagonal head 82 for rotational adjustment. This cam engages the pair of followers 72 to effect the primary adjustment along the loading axis, and is preferably so shaped as to maintain a constant spacing between the followers 72, so that the shoes 36 will remain uniformly engaged with the inner circumference of the bearing in all adjusted positions.

The spacing between the shoes 38 must, however, be varied as the bearing is raised or lowered by the shoes 36, since the bearing presents a varying transverse dimension along the axis of the fingers 70. A second cam 76 is symmetrical with respect to the axis of the axle 10, thereby to adjust the fingers 70 equally and oppositely. This cam is carried by a tubular adjusting shaft 80 which extends concentrically about the shaft 78 through the end cap 34, and terminates in a hexagonal adjusting head 84. The cams and their shafts are rotatably supported by a bearing 73 received within the axle; by plain annular bearings 75 and 77 located between the shafts; and by a plain annular bearing 79 mounted in the end cap. As the cam 76 must be axially offset somewhat from the cam 74, the fingers 70 are correspondingly offset axially from the fingers 72; and the shoes 38 are provided with axial extensions (not shown) for connection to the fingers 70, so that they are aligned axially with the shoes 36 about the inner circumference of the bearing 22.

In adjusting the roll, the cam 76 should first be turned to the position shown, to allow the shoes 38 to retract to the maximum extent, so that a vertical displacement of the bearing 22 may be carried out without interference. The cam 74 is then adjusted until the sleeve 10 is found to be straight along its area of contact with the load; subsequently, the cam 76 is turned to re-engage the shoes 38 transversely with the bearing. As the cam 76 is symmetrical, it effects equal and opposite movements of the shoes 38. Proper contact pressure between the shoes and the bearing may be obtained by turning the adjusting heads 82 and 84 with a torque wrench.

It will be understood that any desired number of spools and intermediate bearings 22 may be employed; and that each spool may be supported on one or two bearings rather than resting at either end on bearings shared with adjacent spools. Either mechanically- or hydraulically-positioned support means of various types may be used. However, where concentric adjusting shafts are used for positioning more than one adjustable bearing, it will be apparent that a larger number of shafts will be required for the second and any further movable bearings, since it is not feasible to extend only two shafts to each of a second pair of cams.

While I have illustrated and described preferred embodiments of the invention by way of illustration, it will be understood by those skilled in the art that various changes and modifications may be made without departing from the true spirit and scope of the invention. I therefore intend to define the invention in the appended claims without limitation to the details of the illustrated embodiments.

What I claim is:

1. A non-deflecting roll comprising an elongated support member having a longitudinal axis, an annular cylindrical sleeve, and means mounting said sleeve for rotation about said support member at at least three axially-spaced support locations, and supporting said sleeve against transverse sagging between said locations; said mounting means being adjustable to vary the relative loci of circumferential surface portions of said sleeve about said support locations to eliminate longitudinal curvature of said sleeve as said support member sags transversely under its own weight and that of a load supported on the surface of said sleeve; said mounting means including a plurality of bearings axially spaced along said support member and rotatably supporting said sleeve thereon, each to define one of said locations; at least one of said bearings being movable transversely to said longitudinal axis of said support member; said mounting means further including bearing supports adjustably positioning at least said one bearing relative to said support member; said bearing supports being constructed and arranged for a first adjustment of at least said one bearing transversely to the longitudinal axis of said support member in the direction of points of load support on said sleeve, and for a second transverse adjustment in a direction normal to the first, to stabilize at least said one bearing against transverse play.

2. A non-deflecting roll comprising an elongated support member having a longitudinal axis, an annular cylindrical sleeve, and means mounting said sleeve for rotation about said support member at at least three axially-spaced support locations, and supporting said sleeve against transverse sagging between said locations; said mounting means being adjustable to vary the relative loci of circumferential surface portions of said sleeve about said support locations to eliminate longitudinal curvature of said sleeve as said support member sags transversely under its own weight and that of a load supported on the surface of said sleeve; said mounting means including a plurality of bearings axially spaced along said support member and rotatably supporting said sleeve thereon, each to define one of said locations; at least one of said bearings being movable transversely to said longitudinal axis of said support member; said mounting means further including bearing supports adjustably positioning at least said one bearing relative to said support member, said bearing supports including cam means rotatably mounted relative to the longitudinal axis of said support member for positioning at least said one bearing, and means for angularly positioning said cam means; said cam means comprising a first cam asymmetrical to said longitudinal axis for positioning said one bearing transversely of the longitudinal axis in the direction of points of load resultant application to said sleeve, and a second cam symmetrical about said longitudinal axis for positioning said one bearing in a second transverse direction normal to the first for stabilizing said one bearing.

3. A roll as recited in claim 2, in which said means for angularly positioning said cam means comprise a pair of adjusting shafts extending axially from an end of said support member into driving engagement each with one of said cams, for independent adjustment thereof.

References Cited
UNITED STATES PATENTS

| | | |
|---|---|---|
| 1,190,257 | 7/1916 | Henderson. |
| 2,261,740 | 11/1941 | Makarius. |
| 2,395,915 | 3/1946 | Specht _____ 29—116 X |
| 2,950,507 | 8/1960 | Keyser. |
| 3,050,829 | 8/1962 | Appenzeller _____ 29—113 |
| 3,070,872 | 1/1963 | Ulrichs et al. _____ 29—113 |
| 3,106,153 | 10/1963 | Westbrook _____ 100—155 |

FOREIGN PATENTS

| | | |
|---|---|---|
| 893,426 | 4/1962 | Great Britain. |

LOUIS O. MAASSEL, *Primary Examiner.*